Sept. 11, 1934.   F. B. JOHNSON ET AL   1,973,485
CIRCUIT INTERRUPTER
Filed Jan. 6, 1934   4 Sheets-Sheet 2
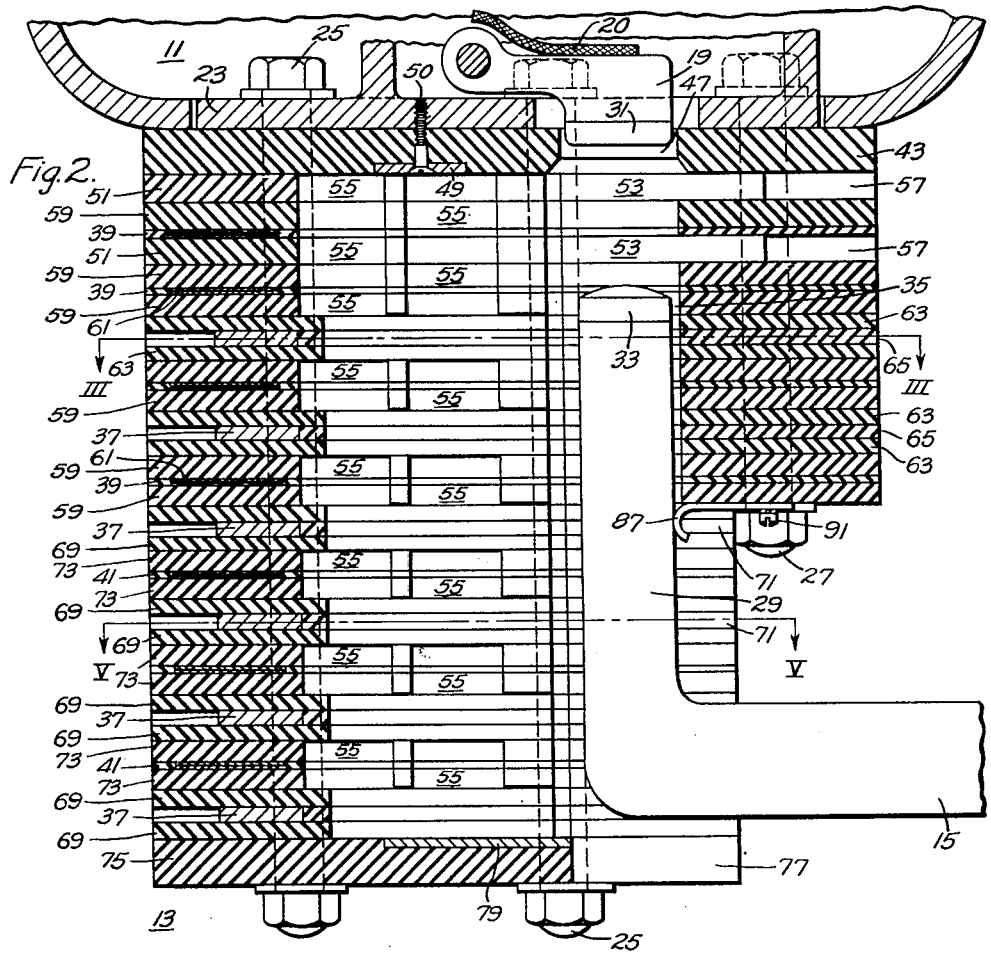
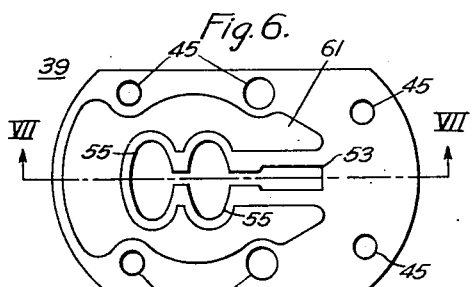
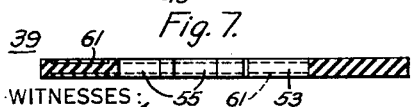
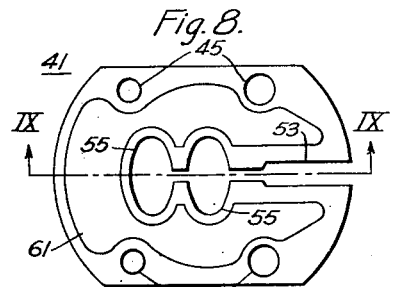
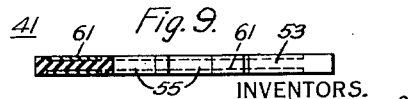
WITNESSES:
INVENTORS.
Frederick B. Johnson &
Winthrop M. Leeds.
BY
ATTORNEY

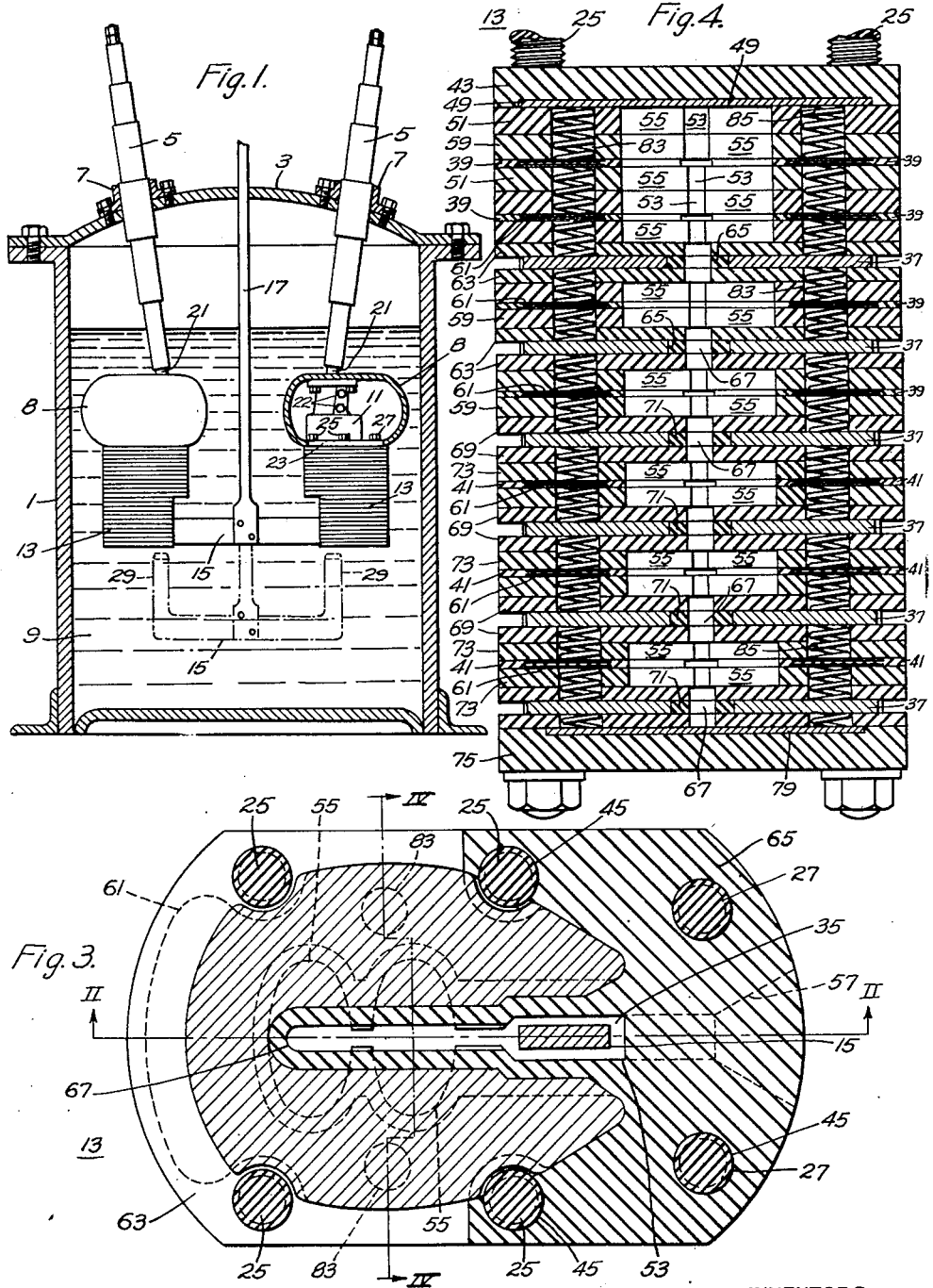

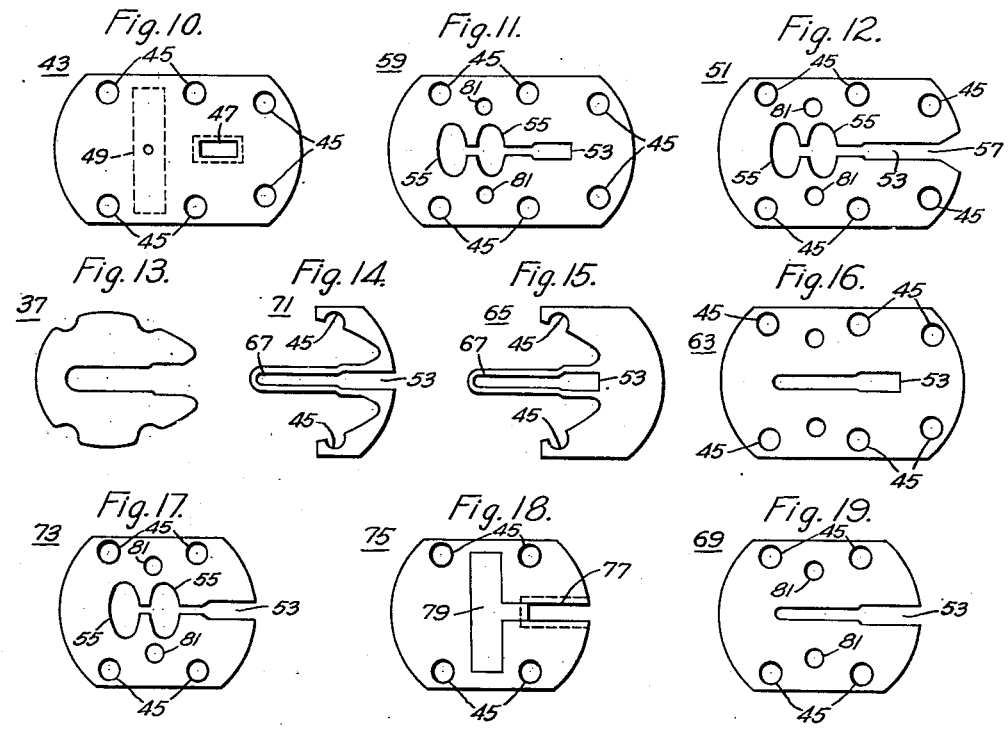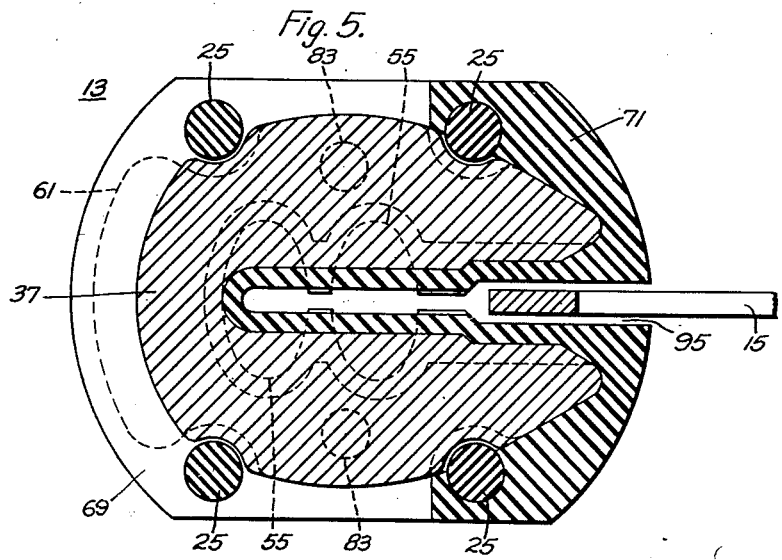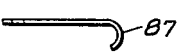

Sept. 11, 1934.　　F. B. JOHNSON ET AL　　1,973,485
CIRCUIT INTERRUPTER
Filed Jan. 6, 1934　　4 Sheets-Sheet 4
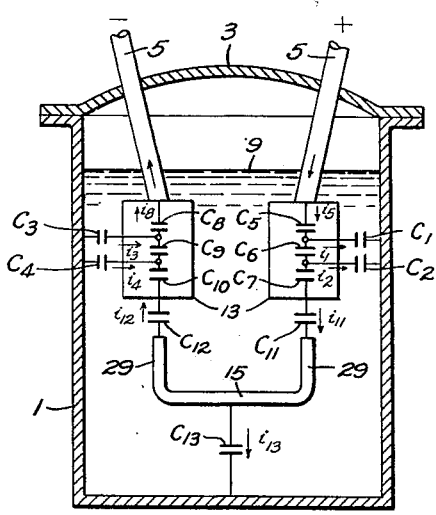
Fig. 22.
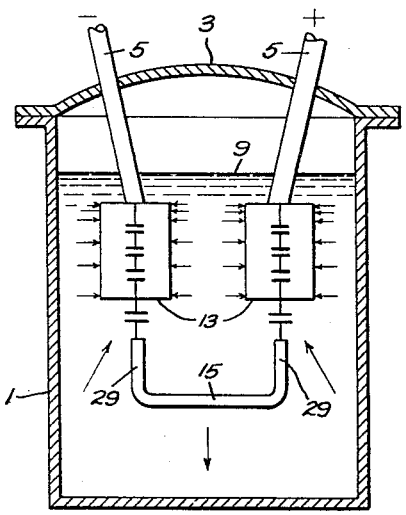
Fig. 23.
Fig. 24.
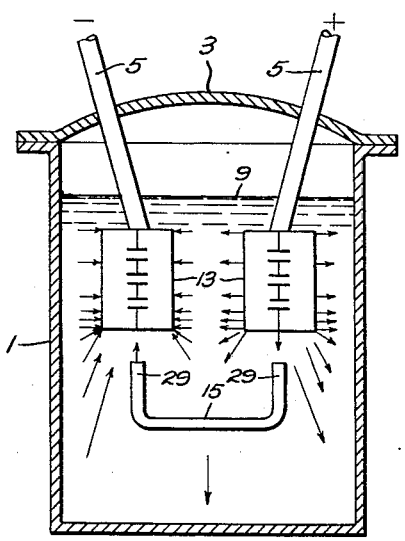
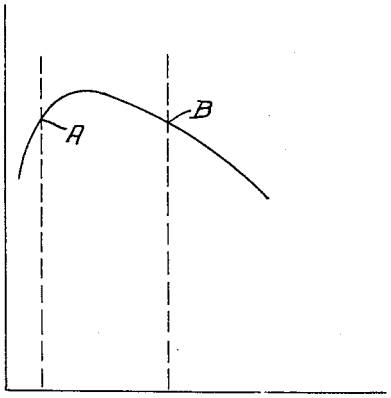
Fig. 25.
WITNESSES:
C. J. Weller
Paul O. Glaister
INVENTORS.
Frederick B. Johnson &
Winthrop M. Leeds.
BY F. W. Lyle.
ATTORNEY Patented Sept. 11, 1934

1,973,485

UNITED STATES PATENT OFFICE 1,973,485

CIRCUIT INTERRUPTER

Frederick B. Johnson, Murrysville, and Winthrop M. Leeds, Wilkinsburg, Pa., assignors to Westinghouse Electric & Manufacturing Company, East Pittsburgh, Pa., a corporation of Pennsylvania Application January 6, 1934, Serial No. 705,580

25 Claims. (Cl. 200—150)

Our invention relates to means for improving the operation of circuit interrupters which utilize arc extinguishers of the side-vented chamber type, particularly when those devices are used on high voltage circuits.

In circuit breakers of this type, the arc incident to the interruption of the controlled circuit is drawn within a side-vented passageway or groove formed in a suitable means of insulating material which is submerged in oil or other arc extinguishing liquid. Spaced slotted plates, usually of iron, are imbedded in the walls of the means defining the arc passage and serve to move the arc therein to effect its extinguishment during the circuit interrupting operation. The arc-moving plates are normally insulated from each other and from the arc.

This arrangement is a most satisfactory one for effecting rapid and positive extinguishment of arcs, the current magnitude of which may vary over a considerable range, and has been used extensively in commercial apparatus. There are no moving parts other than the contact members which move longitudinally through the arc passage to establish the arc therein; there is no need for a complicated magnetic means for moving the arc; and the dangerous pressures normally created within explosion pots and like devices are entirely eliminated by virtue of the side venting of the arc passage. However, despite the obvious advantages of these devices, they have two inherent disadvantages when used on high voltage circuits, and the correction of those disadvantages is the principal object of this invention.

One of these disadvantages arises from the fact that the insulation of the walls of the arc extinguishing structure containing the spaced, electrically isolated arc moving plates, offers a relatively high impedance to the flow of leakage currents from the stationary contact. With the usual forms of commercial insulation, this impedance may be sufficiently great to cause an excessively high potential gradient in those portions of the arc extinguishing structure adjacent the stationary contacts. If this occurs, corona may be formed with resulting deterioration of the insulation comprising the walls of the arc extinguishers.

The other disadvantage likewise results from improper distribution of the leakage currents which flow through the walls of the arc extinguishers when the breaker is in the open-circuit position and is connected to an energized line, and its direct result is to cause an unequal division of voltage between the serially connected breaks of the interrupter. In fact as much as 90% of the total line voltage may be concentrated across one of the serially connected breaks of the arc extinguisher, and during the circuit closing operation, breakdown may result through the walls of the arc extinguishing device itself.

Our invention overcomes these difficulties by providing means for controlling the flow of leakage currents through the walls of the arc extinguisher in such manner that the potential divides substantially equally between the serially connected breaks during the circuit closing operation, and at the same time, controls the potential gradient along the arc passage in such manner that corona formation is prevented. Specifically, the bridging member is connected to the line through a suitable impedance path during at least the final portion of the circuit closing operation. The impedance of the admittance path is comparable in magnitude to the impedance normally existing between the stack and the adjacent metallic parts of the breaker, thus while the bridging member is connected to the line during the circuit closing operation before breakdown through the walls of the arc extinguishing device could occur, the current which flows is not very much greater than the normal leakage current flowing through the breaker.

To prevent the formation of corona, the several arc moving members are interconnected by means of an admittance path which so controls the flow of leakage currents through the arc extinguisher that excessively high potential gradients are avoided.

It so happens that the admittance used for securing the desired equal distribution of voltage between the serially connected breaks may also be used for controlling the voltage gradient when the breaker is in the full-open circuit position. This arrangement is, of course, most desirable in that it obviates the necessity of providing two separate admittance means and thereby reduces the cost of the devices very materially. The principal object of our invention is thus accomplished not only without in any way lessening the effectiveness of the arc extinguishing devices wherein our invention is used but also without unduly increasing the cost of these devices.

The problem of the control of the leakage currents within a high voltage circuit interrupter utilizing arc extinguishers of the side-vented chamber type, has been discussed and certain remedies have been proposed in the application of Benjamin P. Baker, Serial No. 617,306 which was filed June 15, 1932, and which is assigned to the assignee of this invention. The features of our invention are believed to be improvements on the structure shown in the above identified application and the invention is believed to reside in the particular structural features disclosed and in their combination with the cooperating portions of the arc extinguishers.

In our study of the operation of high voltage circuit interrupters utilizing arc extinguishers of the above described type, we have found that considerably improved control of the leakage currents can be effected if the metallic arc moving plates are omitted from the upper portion of the stack. This arrangement has proven particularly successful on breakers for use with circuits wherein the controlled voltages may exceed 200 kv., and it is our belief that arc extinguishers for use with voltages much in excess of this will probably require the omission of the arc moving means in the upper portion of the stack if successful operation is to be assured.

The structure shown in the preferred embodiment of our invention utilizes capacitance means for securing the desired control of the leakage currents, and it is an ancillary object of our invention to provide an improved capacitance unit for use in arc extinguishing devices of the above described type. The various preferred forms and the preferred method of building those forms will be described in some detail later.

Referring to the drawings:

Figure 1 is a sectional view, partially in elevation, of a circuit interrupter utilizing arc extinguishing devices constructed according to our invention. The dimensions of the elements shown in the drawings are not intended to be an accurate representation of the dimensions of a commercial type circuit interrupter but are intended merely to illustrate the relative positioning of the various parts.

Fig. 2 is an enlarged sectional view through one of the arc extinguishing devices forming a part of the circuit interrupter shown in Fig. 1. The view is taken on the line II—II of Fig. 3.

Fig. 3 is a sectional view of the arc extinguishing device shown in Fig. 2 taken on the line III—III of Fig. 2.

Fig. 4 is a sectional view taken on the line IV—IV of Fig. 3.

Fig. 5 is a sectional view taken on the line V—V of Fig. 2.

Fig. 6 is a detail plan view showing one of the condenser units used in the upper portion of the arc extinguishing device shown in Figs. 2 to 5, inclusive.

Fig. 7 is a sectional view taken on the line VII—VII of Fig. 6.

Fig. 8 is a plan view showing one of the condenser units used in the lower portion of the arc extinguishing device.

Fig. 9 is a sectional view similar to Fig. 7 taken on the line IX—IX of Fig. 8.

Figs. 10 to 19, inclusive, are plan views showing the details of the various plate elements which together form the walls of the arc extinguishing device shown in Figs. 2 to 5, inclusive.

Fig. 20 is a plan view of one of the flexible conducting strips used for connecting the bridging bar into the circuit of the serially connected group of condensers forming a part of the arc extinguishing device.

Fig. 21 is a side elevational view of the conducting strip shown in Fig. 20.

Fig. 22 is a diagrammatic view showing the electrical circuit of the circuit interrupter shown in Fig. 1 when the interrupter is in the open circuit position.

Fig. 23 is a diagrammatic view showing the path of flow of the leakage currents in a circuit interrupter similar to that shown in Fig. 1.

Fig. 24 is a diagrammatic view, similar to Fig. 23, showing the distribution of the leakage currents when the impedance of the walls of the arc extinguishing devices has been reduced considerably below the normal value.

Fig. 25 is a curve showing the relationship between the stack impedance and the ability of the device to resist breakdown through the stack insulation during the circuit closing operation.

The preferred embodiment of our invention, illustrated in Fig. 1, comprises the usual circuit breaker structure of a tank 1 having a cover 3, insulated bushings 5 extending through the cover and being supported thereon by means of suitable flanges 7, a body of liquid 9 within the tank, a stationary contact assemblage 11 adapted to be supported upon the lower end of each of the lead-in bushings 5, a static shield 8 adapted to be positioned about each of the stationary contact assemblages, an arc extinguishing device 13 of the side vented chamber type associated with each of the stationary contact assemblages, a bridging bar 15 for cooperating with the stationary contact assemblages 11 to open and to close the circuit, a pull rod 17 for supporting the bridging bar, and suitable mechanism (not shown) for actuating the pull rod.

Each of the stationary contact assemblages 11 includes a pivoted member 19 (Fig. 2) which is electrically connected by means such as the shunt 20 to the lower end of the conductor 21, disposed within the adjacent lead-in bushing 5, and suitable means for supporting the pivoted member. Bolts 22 are provided for affixing the upper portion of the contact assemblage to the conductor 21. A flange 23 is cast integrally with the lower portion of the contact assemblage 11 and is provided with suitable holes for engaging the insulating bolts 25 and 27 upon which the arc extinguishing devices 13 are assembled. The static shield 8 is likewise supported upon the associated bushing and is proportioned so that it cooperates with the stationary contact assemblage to minimize the static stresses in the upper portion of the arc extinguisher device 13.

The bridging bar 15 consists simply of a conducting member having a pair of upstanding contact portions 29, each of which cooperates with one of the pivoted contact members 19 to open and to close the circuit. The engaging contact surfaces 31 and 33 of the pivoted contact member 19 and the upstanding portions 29 of the bridging bar are preferably formed of an arc-resisting conducting material in order to prevent welding or pitting during the operation of the interrupter. The pivoted contact member 19 is normally biased to the position shown in Fig. 2 by a suitable spring (not shown).

Both of the arc extinguishing devices 13 consist essentially of a stack of superposed plates of insulating material, each of which has a centrally disposed opening therein which is adapted to aline with similar openings in the adjacent plates to form an arc passage 35, the cross sectional width of which is considerably less than its cross sectional length. Slotted plates 37 of magnetic material, preferably iron, are imbedded in the walls of each of the arc extinguishers and are adapted to move the arc formed within the arc passage to effect its extinguishment. None of the arc moving plates 37 is disposed in the upper portion of the arc extinguisher, and those plates in the lower portion of both of the arc extinguishers are inter-connected by capacitance units 39 or 41 which cooperate with similar capacitance units disposed in the upper portion of the stack for controlling the flow of leakage currents through the device. All of the insulated plates which form the walls of the arc extinguishing device are held together by means of the stud bolts 25 and 27, of insulating material as is shown particularly in Figs. 2, 3, and 4.

The top plate 43 of each of the arc extinguishing devices is shown particularly in Figs. 2 and 10 and comprises a relatively thick member of insulating material, such as hard fiber, which is provided with six openings 45 for engaging the insulating studs 25 and 27, and a rectangular opening 47 which forms a continuation of the arc passage 35 to permit the upstanding portion 29 of the bridging bar 15 to engage the cooperating pivoted contact member 19. A rectangular metallic plate 49, is imbedded in the lower surface of the plate 43 as is shown in Fig. 10 in order to facilitate the connecting of the serially connected condensers into the circuit. A bolt 50 is utilized to electrically connect the plate 49 to the adjacent stationary contact assemblage.

Immediately beneath the top plate 43 of each of the extinguishers is disposed one of the insulated plates 51 shown particularly in Fig. 12. The plates 51 are each provided with the six circular holes 45 for the supporting studs 25 and 27, and a central opening 53 for defining that portion of the arc passage 35 wherein the contact portion 29 moves to establish an arc. In addition, each plate 51 is provided with a pair of cutout portions 55, adapted to form oil pockets adjacent to the arc passage 35, and a cutout portion 57 for connecting the opening 53, within which the upstanding portion 29 of the bridging member moves, with the edge of the plate. This last opening 57 terminates in a flared section which forms, as is shown in Fig. 2, a vent passage. Immediately beneath each of the upper plates 51 is positioned an insulating plate 59, which is shown particularly in Fig. 11. The plates 59 are exactly similar to the plates 51 except that they are not provided with the vent passage 57.

The first of the condenser units 39 is positioned beneath the upper plate 59. Each of these units, as is shown in Figs. 6 and 7, comprises a relatively thin plate of insulating material with the openings 45, 53, and 55 formed therein, and having a thin coating 61 of metal positioned upon the opposed surfaces thereof, the dimensions of this metallic coating being proportioned to secure the desired capacitance.

Next in order in the stack assemblage is another of the plates 51 which is followed successively by the second plate 59, the second condenser unit 39, and the third plate 59. The plates 51 and 59 are preferably formed of Fuller board or other absorbent material in order to more effectively retain the arc extinguishing liquid in contact with the arc. Other insulating material either absorbent or non-absorbent may be used, however, with satisfactory results.

The first of the arc moving units is disposed beneath the third plate 59 and comprises a slotted iron plate 37 (Fig. 13) which is sandwiched between two fibre plates 63 (Fig. 16). In order that the arc moving plate 39 shall be insulated from the arc passage 35 at all times, a fibre liner plate 65 (Fig. 15) of substantially the same thickness as the iron plates 37 is positioned between each pair of fibre plates 63. The fibre plates 63 and the liner plates 65 are provided with the openings 45 and 53, and while neither has the pocket defining openings 55 both are provided with a slot 67 for defining the inner surfaces of the arc passage.

A fourth insulating plate 59 is disposed beneath the upper arc moving unit. This is followed by a third condenser unit 39, a fifth insulating plate 59, a second arc moving unit likewise comprising a slotted iron plate 37 and a liner plate 65 disposed between two insulating plates 63, a sixth plate 59, a fourth condenser unit 39, and a seventh plate 59. The seventh plate 59 is the last of the plates which is adapted to be retained in position by the short studs 27.

The remaining portion of each of the arc extinguishers 13 is made up of four arc moving units and three oil retaining units alternately disposed. Each of the arc moving units comprises an iron plate 37 and a liner plate 71 (Fig. 14) sandwiched between two fibre plates 69 (Fig. 19). The plates 69 and 71 are essentially similar to the corresponding plates 63 and 65 in the upper portion of the stack and are provided with similarly disposed openings 45, 53, and 67. In the plates 69 and 71, however, the opening 53 is extended to the edge of the plates, both to vent the arc passage 35 and to permit the body portion of the bridging bar 15 to pass therethrough during the operation of the interrupter.

Each of the oil retaining and spacing units, the first of which is disposed beneath the upper arc moving unit, comprises two Fuller board plates 73 (Fig. 17) positioned on either side of a condenser unit 41 (Figs. 8 and 9). The plates 73 are similar in outline to the plates 59, and include four of the openings 45, and the openings 53 and 55. As in the case of the plates 69 the opening 53 is extended to the extreme edge of each of the plates.

The condenser units 41 differ only very little from the condenser units 39. Each includes the metallic coating 61 on the opposed surfaces of the plate, the openings 55 and 53 and four of the openings 45. The opening 53 extends to the edge of the plate.

The lower plate 75 (Fig. 18) which is positioned beneath the fourth arc moving unit is of substantially the same thickness as the top plate 43, and is provided with a cutout portion 77 wherein the bridging member moves and the four common openings 45. A metallic plate 79 is inserted in the upper surface of the lower plate contacting the admittance path formed by the condenser units.

All of the insulating plates 51, 59, 63, 69, 73, and 75 are provided with two openings 81 which are adapted to aline in the assembled arc extinguisher to form passage ways 83 between the conducting portions 61 of the condenser units 39 and 41 and the iron plates 37. Coil springs 85 (shown particularly in Fig. 4) are disposed within these passage ways 83 and are adapted to electrically interconnect the several condenser units to form a group of serially connected capacitances.

In the upper portion of each of the arc extinguishing stacks 13, the springs 85 are utilized for interconnecting the condensers one to the other and for connecting the uppermost portion of the group of serially connected condensers to the metallic insert 49 in the top plate 43 of the arc extinguisher (see Fig. 4). In the lower portion of each of the arc extinguishing devices the springs 85 are utilized for interconnecting the condenser units and also for connecting the condenser units to the arc moving members 37 in order to prevent corona formation and the like. A pair of flat spring members 87 (shown particularly in Figs. 20 and 21) are provided for connecting the two upstanding portions 29 of the bridging means in circuit with the upper portion of each of the groups of serially connected condensers during the circuit closing operation. One of the spring members 87 is disposed beneath the outwardly projecting upper portion of each of the arc extinguishing devices 13 and is connected to the lowermost condenser unit 39 of the upper portion of the device by means of a screw 91. By this arrangement equal amounts of impedance are connected across each of the serially connected breaks so as to cause a substantially equal division of the voltage across the two breaks. In addition, the two impedance paths serve to connect the metallic arc moving members 37 to the bridging member 15 when the breaker is in the closed circuit position. The arc moving members 37 are thereby brought to the same potential as the bridging member 15, and static discharges between the arc moving members and the bridging member is prevented. Only the upper portion of each of the groups of capacitance units, which comprise the impedance path in the preferred form of our invention, is used for securing equal division of voltage across the serially connected breaks, although all of each of the groups of serially connected capacitances is used for obtaining proper voltage gradient when the breaker is in the open circuit position.

The condenser units 39 and 41 are shown particularly in Figs. 6 to 9, inclusive. Preferably, each of the condenser units comprises a thin plate of a moldable insulating material having a thin metallic insert 61 of predetermined area molded in the opposed surfaces thereof. The moldable insulating materials which comprise a fibrous base and a resinous binder are particularly suitable for this purpose.

There are, however, other arrangements which are equally satisfactory; for example: a thin metallic coating of the desired area may be sprayed upon the surface of a thin sheet of insulating material having suitable dielectric qualities; or, a very thin sheet of conducting material or foil may be cemented or otherwise securely affixed to the surfaces of a sheet of insulating material.

The particular merit of the arrangement disclosed resides in the provision of a condenser unit which may be interposed between the wall defining plates of a side-vented chamber type arc extinguisher without in any way detracting from the normal operation or altering the physical dimensions of that device. Also, the capacitances may be readily varied to meet changing circuit conditions merely by changing the thickness of the dielectric or by varying the area of the condenser plates.

In the assembled arc extinguisher the openings 55 in the Fuller board insulating plates 51, 59, and 73 serve to form a plurality of oil pockets disposed adjacent the arc passage proper. These pockets are in turn separated from each other by the inwardly projecting central portion of the arc moving units. In the structure shown in the drawings, the lower portion of each of the arc extinguishing devices 13 is provided with an opening 95 (Fig. 5) for permitting the body portion of the bridging member 15 to move therethrough during the operation of the device. By virtue of this, the length of the upstanding portion 29 need be only sufficiently great to permit the engagement of the cooperating contact surfaces; and, while the arc passage itself may be as long as is necessary for the successful interruption of high voltage circuits, the dimensions of the tank may be kept within reasonable limits without reducing the normal clearances. In the preferred embodiment disclosed, the upper portion of each of the stacks is vented only adjacent the associated stationary contact assemblage 11. This restricting of the vent openings is of value in securing an out-flowing blast of gas of somewhat greater velocity than that secured if the full length of the arc passage is vented.

The operation of my invention may best be discussed in conjunction with Figs. 22, 23, and 24, and the diagram of Fig. 25. Fig. 22 shows diagrammatically the electrical characteristics of a circuit breaker having the previously described type of arc extinguisher. It has been assumed, for the purposes of this discussion, that the right hand terminal 5 of the interrupter is above ground potential and the left hand terminal 5 of the interrupter is below ground potential by substantially the same amount. The condensers $C_1$ and $C_2$ represent the total distributed capacity of the right-hand stack 13 to the tank 1, and the capacitances $C_3$ and $C_4$ represent the distributed capacity of the left-hand stack 13 of the tank 1. In reality, both of the distributed capacities result from the summation of small increments of capacity along the entire length of the stack. Similarly, the condensers $C_5$, $C_6$, $C_7$, $C_8$, $C_9$, and $C_{10}$ have been substituted for the internal capacity of the stacks themselves, and the capacitances $C_{11}$, $C_{12}$, and $C_{13}$ have been substituted for the total stack to bridging bar capacitances and bridging bar to tank capacitances, respectively. These capacitances all result from the electrostatically floating arc moving members which are spaced throughout the lower portion of each of the arc extinguishing devices 13.

The total leakage current which flows on open circuit, due to the differences in potential, is represented by the letter "I". The current in the top of the right-hand stack 13 is represented by $i_5$, and the leakage current in the bottom of the stack is represented by $i_{11}$. The leakage currents from the right-hand stack to the tank are represented by $i_1$ and $i_2$. The corresponding currents in the left-hand stack are $i_8$ and $i_{12}$, $i_3$, and $i_4$, respectively; and the current flowing from the bridging bar to the tank is represented by $i_{13}$. It is readily apparent that the leakage current $i_5$ in the upper portion of the right-hand stack will be equal to the current $i_{11}$ at the lower end plus the leakage currents $i_1$, and $i_2$, which flow from the stack to the tank. Likewise, the current $i_8$ in the top of the left-hand stack will be made up of the current $i_{12}$ that flows in the bottom of the stack plus the currents $i_3$ and $i_4$ which flow from the tank to the stack.

From this simple analysis, it follows that with the potential applied as indicated, the current through each element of each of the stacks will increase as the terminal or upper end of the stack is approached. The unit impedance of the stack to this flow of current is substantially uniform along the length of the stack and may be considered as "$dz$" per elemental length; the elemental voltage drop "$de$" which is equal to the product of "$dz$" and the instantaneous current $i$ will, therefore, increase as the terminal end of each of the stacks is approached. Thus, the magnitude of the voltage gradient along the stack is substantially determined at any particular point by the magnitude of the current which flows through the stack at that point, and if the impedance of the stack is high in comparison with the impedance existing between the stack and the tank wall, the voltage gradient in the upper portion of the stack will tend to reach the maximum possible value and corona will result.

If the other terminal is connected to a non-energized line, as frequently occurs during switching operations, the distribution of the leakage currents will depend entirely upon the relative magnitude of the condensers $C_1$, $C_2$ and the admittance path between the bridging bar and the two terminals of the breaker, it being assumed, of course, that the tank is grounded. Ordinarily, the capacitances $C_1$ and $C_2$ are large in comparison with the capacitance existing between the bridging bars and the terminals, and as a result the greater portion of the voltage of the controlled circuit is impressed across one of the two breaks. Then, as the contact portion 29 of the bridging member 15 moves upwardly through the arc passage 35, it may, and frequently does happen, that the insulation of the walls of the arc extinguishing device becomes incapable of withstanding the voltage impressed thereacross and breaks down. The breakdown does not ordinarily occur through the oil, because oil has a somewhat higher dielectric value than the usual forms of commercial insulation. By our invention, however, we connect an admittance path across both of the serially connected breaks before any possibility of breakdown through the walls of the arc extinguisher can exist, and by causing a current to flow through the bridging bar which is comparable in magnitude to the normal leakage current, a substantially equal division of voltage between the serially connected breaks is attained during the circuit-closing operation and breakdown through the stack structures is obviated.

If the impedance through the stack is high in comparison with the impedance between the stack and the tank wall, the voltage gradient in the upper portion in the stack will reach the maximum possible value. If, however, the impedance through the stack is low in comparison with the impedance between the stack and the tank, practically all of the leakage current will flow entirely through the stack and the result will be an intensifying of the voltage gradient at the lower portions of the structure. These two extreme variations are illustrated diagrammatically in Figs. 23 and 24, the distribution of the leakage currents being indicated by the position and number of the arrows. The best operating condition is somewhere between these two extremes and may be obtained as we have pointed out, by the provision of a properly portioned admittance path through the walls of the arc extinguisher.

The magnitude of the admittance to be introduced into the stack structure to give its impedance the correct value depends upon a number of variables, such as the mechanical dimensions of the apparatus, the dielectric used, the circuit voltage, and others; in fact, the complexity of the problem has necessitated a trial and error solution. For each structure, sufficient data are obtained to draw a curve as shown in Fig. 25, which shows the variation of stack breakdown or flashover voltage with stack impedance, and, since high stack breakdown voltage is the criterion for most efficient operation, a ready selection of the proper size admittance elements, for the particular structure involved, may be made.

Considering the effect of varying the stack impedance, it can be seen from the curve that the breakdown voltage will have a maximum point at some intermediate value of impedance. If the total stack impedance is relatively low, the flashover value of the stack will be correspondingly low. As the stack impedance is increased, the flashover voltage will increase until a point is reached where further increase in the stack impedance causes such an increase in the leakage current flowing between the stack proper and the metal tank and breaker parts that breakdown results from the excessive voltage gradient at the top of the stack. It is desirable, therefore, that the overall impedance of the stack (as shown in Fig. 25) be adjusted to some value between the points A and B and as near to the maximum flashover as possible.

Figs. 23 and 24, as mentioned above, show the effects of high and low overall stack impedance on the electrostatic field distribution within the circuit breaker. If the impedance is considerably greater than that shown by the point B on the curve, a field distribution such as the Fig. 23 results. The leakage currents and the corona forming voltage gradients are then concentrated in the top portion of the stack, at which point breakdown may occur. For an overall stack impedance of an appreciably lesser value than that shown by the point A on the curve, the field distribution is approximately that shown in Fig. 24. Here, the leakage currents are concentrated in the lower portions of the stack and breakdown over to the tank may occur at that point. The ideal field distribution is, of course, somewhere similar between these two extremes. We have not attempted to apply quantitative values during this discussion, because any specific values would apply only to some one particular structure.

The embodying of our invention into an arc extinguishing device not only does not interfere with but actually improves the normal operation of that structure. During the circuit opening operation, the arc is established within the arc passage of groove 35 formed by the alined central openings in the wall defining plates and is almost immediately forced by the magnetic action of the arc moving members into the narrower openings 67 and the connecting oil pockets 55. The heat of the arc causes the formation of large volumes of gas, and in venting, these gases, flow outwardly through the arc in a transverse direction thereby cooling and extinguishing it. By the elimination of the metallic arc moving plates from the upper portion of the device, the building up of the restored voltage is impeded and, the extinction of the arc during an early current zero period is thereby facilitated.

The group of serially connected capacitances formed by the condenser units 39 and 41 so controls the distribution of the leakage currents that unreasonable or dangerously large voltage gradients are effectively eliminated, and in addition, it permits the securing of a substantially equal division of voltage between the serially connected breaks during the circuit closing operation. Thus, damage to the stack insulation, which might occur by the formation of corona as a result of an improper voltage gradient on open circuit conditions, or as a result of break down of the insulation during the circuit closing operation, is entirely obviated.

While we have disclosed certain specific embodiments of our invention, it is to be understood that the principles involved are capable of wide application to various other structures. It is our desire, therefore, that the language of the appended claims shall be accorded the broadest reasonable construction, and that our invention shall be limited only by what is expressly stated therein and by the prior art.

We claim as our invention:

1. In a circuit interrupter, means, at least partially of insulating material, for defining an arc passage; means for establishing an arc within said passage; and means comprising one or more members of magnetic material for moving said arc within said passage to effect its extinguishment; said arc moving members being positioned along only a portion of said arc passage.

2. In a circuit interrupter, means, at least partially of insulating material, for defining an arc passage, having a cross-sectional width which is less than its cross-sectional length; means for establishing an arc within said passage; means, comprising a plurality of spaced members of magnetic material, for moving said arc within said passage; and means for insulating said spaced members from the arc; said spaced arc moving members being positioned along only a portion of said arc passage.

3. In a circuit interrupter, means, at least partially of insulating material, for defining an arc passage; conducting means movable longitudinally through said arc passage to establish an arc therein; means comprising a plurality of spaced members of magnetic material for moving said arc within said passage; and means for insulating said spaced members from the arc; none of said spaced arc moving members being positioned adjacent that portion of said arc passage wherein the arc is initially established.

4. In a circuit interrupter; means, comprising a plurality of superposed plates of insulating material for defining the walls of an arc passage, means for establishing an arc within said passage; and means comprising a plurality of spaced members of magnetic material for moving said arc within said passage to effect its extinguishment; said spaced arc moving members being positioned along only a portion of said arc passage.

5. In a circuit interrupter; means, comprising a plurality of superposed plates of insulating material for defining the wall of an arc passage; means for establishing an arc within said passage; and means comprising a plurality of spaced slotted plates of magnetic material for moving said arc within said passage to effect its extinguishment; each of said slotted plates being imbedded in the walls of said arc passage and being insulated from said arc passage by said wall defining means; said slotted plates being positioned along only a portion of said arc passage.

6. In a multi-break circuit interrupter; contact means and a bridging means for opening and for closing the controlled circuit; said bridging means being movable to cause at least two serially connected breaks during the circuit opening operation; means for extinguishing the arc established at each of said serially connected breaks during the circuit opening operation; each of said arc extinguishing means including means of insulating material which constitute the walls of an arc passage wherein a portion of said bridging means moves during the operation of said interrupter; and means for preventing breakdown through the walls of each of said arc extinguishing means during the circuit closing operation; said breakdown preventing means comprising a plurality of condenser units, metallic means for connecting said condenser units so as to form two groups of serially connected capacitances, means for connecting one of said groups across each of the said serially connected breaks during at least a portion of the circuit closing operation; said condensers being so proportioned that the admittance of each of said groups of capacitances is sufficiently large to prevent breakdown through the arc extinguishers but at the same time being sufficiently small to definitely limit the current flowing therethrough to a value comparable with the magnitude of normal leakage currents flowing through said interrupter.

7. In a circuit interrupter, means of insulating material for defining the walls of an arc passage; a pair of cooperating contact means for opening and for closing the circuit; one of said contact means having a portion movable through said arc passage during the operation of said interrupter; and means for preventing breakdown through said means of insulating material during the circuit closing operation; said breakdown preventing means comprising a plurality of condensers, metallic means for inter-connecting said condensers to form a group of serially connected capacitances, means for connecting one end of said group to one of said pair of contact means, and means for connecting the other end of said group to the other of said pair of contact means during at least a portion of the circuit closing operation.

8. In a circuit interrupter; means comprising a stack of plates of insulating material for defining the walls of an arc passage; a pair of co-operating contact means for opening and for closing the circuit controlled by said interrupter; one of said contact means having a portion movable through said arc passage during the operation of said interrupter; and means for preventing breakdown through the walls of said arc passage during the circuit closing operation; said breakdown preventing means comprising a plurality of condensers, each of which is formed from one of the insulating plates which constitute said wall defining means, means comprising a plurality of coiled springs for interconnecting said condensers to form a group of serially connected capacitances, means for electrically connecting one end of said group to one of said pair of contact means, and means for electrically connecting the other end of said group to the other of said pair of contact means during at least a portion of the circuit closing operation, said wall defining means having passageways formed therein for containing said coiled springs.

9. In a circuit interrupter; means comprising a stack of plates of insulating material for defining the walls of an arc passage; some of said plates having coatings of conducting material on the opposed surfaces thereof to form condenser units of predetermined capacitance; a pair of cooperating contact means for opening and for closing the circuit controlled by said interrupter; one of said contact means having a portion movable through said arc passage during the operation of said interrupter; and means for preventing breakdown through the walls of said arc passage during the circuit closing operation; said breakdown preventing means comprising said plurality of condenser units, means for interconnecting said condensers to form a group of serially connected capacitances, means for electrically connecting one end of said group to one of said pair of contact means, and means for electrically connecting the other end of said group to the other of said pair of contact means during at least a portion of the circuit closing operation.

10. In a circuit interrupter; means comprising a stack of plates of insulating material for defining the walls of an arc passage; each of some of said plates comprising a relatively thin sheet of a moldable insulating material having metallic inserts of predetermined area molded in the opposed surfaces thereof to form condenser units of predetermined capacitance; a pair of cooperating contact means for opening and for closing the circuit controlled by said interrupter; one of said contact means having a portion movable through said arc passage during the operation of said interrupter; and means for preventing breakdown through the walls of said arc passage during the circuit closing operation; said breakdown preventing means comprising said plurality of condenser units, means for interconnecting said condensers to form a group of serially connected capacitances, means for connecting one end of said group to one of said pair of contact means, and means for connecting the other end of said group to the other of said pair of contact means during at least a portion of the circuit closing operation.

11. In a circuit interrupter, means of insulating material for defining the walls of an arc passage; means for establishing an arc within said passage; means comprising a plurality of spaced members of magnetic material for moving said arc in said passage to effect its extinguishment; and admittance means for interconnecting at least some of said members in order to control the flow of leakage currents through the walls of said arc passage; said admittance means comprising condensers the conducting portions of which are entirely independent of said arc moving members.

12. In a circuit interrupter, means of insulating material for defining the walls of an arc passage, means for establishing an arc within said passage; means comprising a plurality of spaced members of magnetic material for moving said arc in said passage to effect its extinguishment; and capacitance units for interconnecting at least some of said members in order to control the flow of leakage currents through the walls of said arc passage; said capacitance units comprising relatively thin sheets of a moldable insulating material having metallic inserts of predetermined area molded in the opposed surfaces thereof.

13. In a circuit interrupter, means of insulating material for defining the walls of an arc passage; means for establishing an arc within said passage; means comprising a plurality of spaced members of magnetic material for moving said arc in said passage to effect its extinguishment; and admittance means for interconnecting at least some of said members in order to control the flow of leakage currents through the walls of said arc passage; said capacitance units comprising relatively thin sheets of a moldable insulating material, which comprises a fibrous base and a resinous binder, having thin metallic inserts of predetermined area molded in the opposed surfaces thereof.

14. In a circuit interrupter, means of insulating material for defining the walls of an arc passage; means for establishing an arc within said passage; means comprising a plurality of spaced members of magnetic material for moving said arc in said passage to effect its extinguishment; and admittance means for interconnecting at least some of said members in order to control the flow of leakage currents through the walls of said arc passage; said capacitance units comprising relatively thin sheets of insulating material, the opposed surfaces of which have been covered in a predetermined area with a sprayed-on metallic coating.

15. In a circuit interrupter; means of insulating material for defining the walls of an arc passage; means for establishing an arc within said passage; means comprising a plurality of spaced, superposed members of magnetic material for moving said arc in said passage to effect its extinguishment; said superposed members being imbedded in the walls of said arc passage; and admittance means likewise imbedded in the walls of said passage for interconnecting at least some of said superposed members in order to control the flow of leakage currents through the walls of said passage; said admittance means being connected to said plates by means of metallic conductors which extend through suitable passageways formed in the walls of said passage.

16. In a circuit interrupter; means of insulating material for defining the walls of an arc passage; means for establishing an arc within said passage; means comprising a plurality of spaced, superposed members of magnetic material for moving said arc in said passage to effect its extinguishment; said superposed members being imdedded in the walls of said arc passage; and admittance means comprising capacitance units for interconnecting at least some of said superposed members in order to control the flow of leakage currents through the walls of said passage; said capacitance units being imbedded in the walls of said passage, the walls of said arc passage having passageways therein extending between at least some of said arc moving members and said capacitance units; said arc moving members being connected to said capacitance units by means of coil springs disposed within said passageways.

17. In a circuit interrupter; means comprising a stack of plates of insulating material for defining the walls of an arc passage; some of said plates having thin coatings of conducting material on the opposed surfaces thereof to form condenser units of predetermined capacitance; means for establishing an arc within said passage; means comprising a plurality of spaced members of magnetic material for moving said arc in said passage to effect its extinguishment; and admittance means which includes said condenser units for interconnecting at least some of said arc moving members in order to control the flow of leakage currents through the walls of said arc passage.

18. In a circuit interrupter; means comprising a stack of plates of insulating material for defining the walls of an arc passage; some of said plates having thin coatings of conducting material on the opposed surfaces thereof to form condenser units of predetermined capacitance; means for establishing an arc within said passage; means comprising a plurality of spaced members of magnetic material for moving said arc in said passage to effect its extinguishment; and admittance means which includes said condenser units for interconnecting at least some of said arc moving members in order to control the flow of leakage currents through the walls of said arc passage, said condenser units being positioned at spaced intervals along said arc passage and being connected to said arc moving members by means of coil springs; said walls having passageways therein for containing said springs and for insulating them from the arc passage.

19. In a circuit interrupter, means of insulating material for defining the walls of an arc passage; means for establishing an arc within said passage; means comprising a plurality of spaced members of magnetic material positioned along only a portion of said arc passage for moving the said arc therein to effect its extinguishment; and admittance means which comprises a plurality of capacitance units positioned at spaced intervals along the entire length of said arc passage for controlling the flow of leakage currents through the walls of said arc passage; said capacitance units being electrically connected to at least some of said arc moving members.

20. In a circuit interrupter; means comprising a stack of plates of insulating material for defining the walls of an arc passage; some of said plates having thin coatings of conductive material on the opposed surfaces thereof to form condenser units of predetermined capacitance; said condenser units being positioned at spaced intervals along the entire length of said arc passage; means for establishing an arc within said passage; means comprising a plurality of members of magnetic material positioned at spaced intervals along only a portion of said arc passage for moving the said arc therein to effect its extinguishment; and admittance means which includes said condenser units for controlling the flow of leakage currents through the walls of said arc passage; said admittance means being electrically connected to at least some of said arc moving members to prevent corona formation when said interrupter is in the open circuit position.

21. In a circuit interrupter; a pair of contact means and a bridging means for opening and for closing the controlled circuit, said bridging means and said pair of contact means cooperating to cause at least two serially connected breaks in the controlled circuit during the circuit opening operation; an arc extinguishing device for each of said breaks, comprising an arc passage, the walls of which are defined by means of insulating material; each of said arc extinguishing devices including admittance means for controlling the flow of leakage currents through the walls thereof; and means for electrically connecting only a portion of one of said admittance means across each of said breaks during the operation of said interrupter to secure substantially equal division of voltage between the serially connected breaks.

22. In a circuit interrupter; a pair of contact means and a bridging means for opening and for closing the controlled circuit; said bridging means and said pair of contact means cooperating to cause at least two serially connected breaks in the controlled circuit during the circuit opening operation; an arc extinguishing device for each of said breaks, comprising an arc passage, the walls of which are defined by means of insulating material; each of said arc extinguishing devices including admittance means which comprises a group of electrically interconnected capacitances, for controlling the flow of leakage currents through the walls thereof; and means for electrically connecting only a portion of one of said groups of capacitances across each of said breaks during the operation of said interrupter to secure substantially equal division of voltage between the serially connected breaks.

23. In a circuit interrupter; means of insulating material for defining the walls of an arc passage; a pair of cooperating contact means for opening and for closing the circuit; one of said contact means having a portion movable through said passage during the operation of said interrupter; admittance means for controlling the flow of leakage currents through the walls of said arc passage; and means for connecting only a portion of said admittance means across the break formed by said pair of cooperating contact means during at least a portion of the circuit closing operation.

24. In a circuit interrupter; a plurality of plate members, at least some of which are of insulating material, for defining the walls of an arc passage; a pair of cooperating contact means for opening and for closing the circuit; one of said contact means having a portion movable through said arc passage during the operation of said interrupter; some of said plate members comprising capacitance units which are disposed at spaced intervals along said arc path and are interconnected by conducting means to control the flow of leakage currents through the walls of said arc passage; and means for connecting only some of said interconnected capacitance units across the break formed by said pair of cooperating contact means during at least a portion of the circuit closing operation.

25. In a circuit interrupter; a plurality of plate members, at least some of which are of insulating material, for defining the walls of an arc passage; and a pair of cooperating contact means for opening and for closing the circuit; one of said contact means having a portion movable through said arc passage during the operation of said interrupter; some of said plate members of insulating material having thin metallic coatings upon the opposed surfaces thereof for the purpose of forming capacitance units; said capacitance units being positioned along said arc passage at spaced intervals and being interconnected by metallic means to control the flow of leakage currents through the walls of said arc passage.

FREDERICK B. JOHNSON.
WINTHROP M. LEEDS.